W. W. WOOD, Jr.
VEHICLE SKEIN.
APPLICATION FILED FEB. 19, 1915.

1,171,293.  Patented Feb. 8, 1916.

WITNESSES:
L. Hauerstein
A. L. Kitchin

INVENTOR
William Wilton Wood Jr.
BY
ATTORNEYS

UNITED STATES PATENT OFFICE.

WILLIAM WILTON WOOD, JR., OF HUNTINGTON, NEW YORK.

VEHICLE-SKEIN.

1,171,293.  Specification of Letters Patent.  Patented Feb. 8, 1916.

Application filed February 19, 1915. Serial No. 9,292.

*To all whom it may concern:*

Be it known that I, WILLIAM WILTON WOOD, Jr., a citizen of the United States, and a resident of Huntington, in the county of Suffolk and State of New York, have invented a new and Improved Vehicle-Skein, of which the following is a full, clear, and exact description.

This invention relates to improvements in vehicle skeins, and has for an object to provide an improved construction which is automatically self lubricating.

Another object in view is to provide a skein for a vehicle axle which will act in the usual manner of skeins of this character while forming a fountain lubricating structure.

Figure 1:
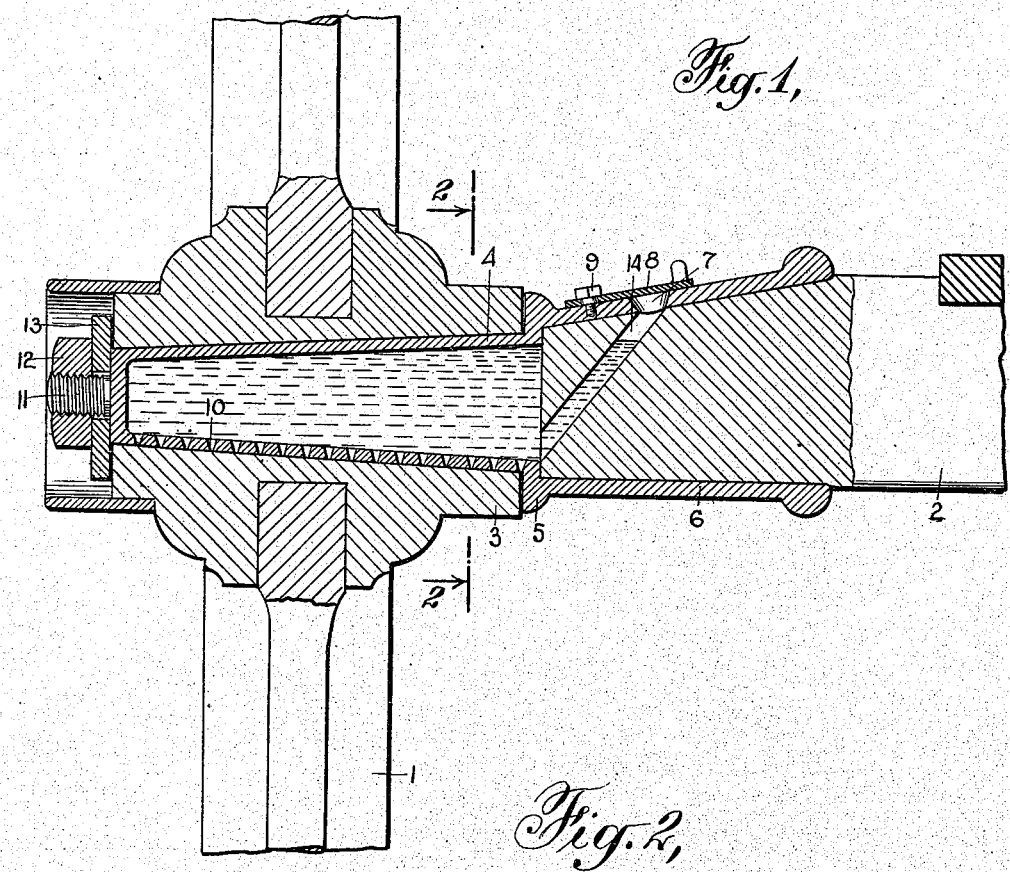
Figure 2:
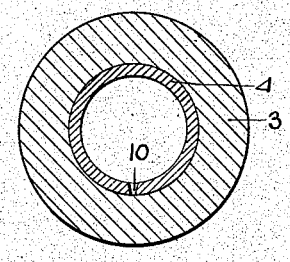

In the accompanying drawings—Figure 1 is a longitudinal vertical section through the hub of a wheel and the skein of an axle, the same embodying the invention; Fig. 2 is a section through Fig. 1 on line 2—2.

Referring to the accompanying drawings by numerals, 1 indicates a wheel of any desired kind and 2 an axle of any desired kind. The wheel 1 is provided with a hub 3 of any desired structure which receives the bearing extension 4 of the skein 5 arranged on the axle 2. The bearing extension 4 is formed integral with a telescoping thimble 6 fitting on the axle 2, and if desired secured thereto by bolts in any desired manner. The thimble 6 is provided with an opening 7 normally covered by a pivotally mounted catch 8 held frictionally against movement by the screw 9 which clamps the cover 8 tightly against the thimble 6. It is to be understood that the clamping action of screw 9 is sufficient for holding the cover 8 in any position, but will allow a pivotal movement when some considerable force is used. The bearing member 4 is hollow, and is provided with one or more rows of apertures 10 which are preferably tapering from the interior of member 4 to the exterior. This allows the free outflow of oil or other lubricant in small quantities distributed over a comparatively large area, and from one side of the hub to the other. It is to be observed that the apertures 10 are arranged only at the bottom or lowermost point. Preferably the end of member 4 is made solid and provided with a threaded extension 11 for receiving nut 12, the same clamping a washer 13 in place, which washer acts as a stop for preventing the accidental disengagement or removal of hub 3 from bearing member 4. In order that oil may be inserted into the bearing member 4 at any time, a passageway 14 is provided in the end of axle 2 so as to guide the oil or other lubricant from opening 7 to the interior of bearing member 4. If desired the opening 7 could be made nearer the bearing member 4 and the end of axle 2 cut off, which will allow the oil to be poured directly into the open space in the skein.

Any desired kind of oil may be used, as for instance an ordinary oil which will flow, or a heavy oil, such as axle grease, which is in the form of a paste. The heat created by the friction will melt sufficient of the paste or axle grease to allow a flow thereof through aperture 10.

What I claim is—

In a device of the character described, the combination with an axle having an aperture therein extending from the periphery adjacent one end to said end, of a skein comprising a hollow bearing portion having apertures in the lower part thereof, a thimble for telescoping over said end of said axle and over said aperture, said thimble being formed with an inlet aperture registering with one of the passageways in said axle whereby oil may be inserted into said bearing portion through said inlet and said passageway, and a covering member for said inlet aperture.

In testimony whereof I have signed my name to this specification in the presence of two subscribing witnesses.

WILLIAM WILTON WOOD, JR.

Witnesses:
 FRANK F. BARRETT,
 RAYMOND LA CLAIR.

Copies of this patent may be obtained for five cents each, by addressing the "Commissioner of Patents, Washington, D. C."